United States Patent [19]
Zimmer

[11] 3,910,277
[45] Oct. 7, 1975

[54] CRYOPROBE AND FLEXIBLE CONNECTOR THEREFOR

[75] Inventor: Hildebrand Zimmer, Ahrensburg, Germany

[73] Assignee: Drägerwerk AG, Germany

[22] Filed: Apr. 24, 1974

[21] Appl. No.: 463,773

[30] Foreign Application Priority Data
Apr. 26, 1973 Germany............................ 2321089

[52] U.S. Cl. ............. 128/303.1; 138/120; 138/137; 138/149
[51] Int. Cl.² .................. A61B 17/36; F16L 11/12; F16L 11/18
[58] Field of Search.................. 62/293; 128/303.1; 138/120, 137, 149

[56] References Cited
UNITED STATES PATENTS

| | | | |
|---|---|---|---|
| 428,023 | 5/1890 | Schoff.............................. | 138/120 |
| 586,113 | 7/1897 | Bott................................. | 138/120 X |
| 982,482 | 1/1911 | Donnelly......................... | 138/137 X |
| 2,095,678 | 10/1937 | Slutz et al...................... | 128/303.1 UX |
| 3,220,414 | 11/1965 | Johnston......................... | 128/303.1 UX |
| 3,272,203 | 9/1966 | Chato.............................. | 128/303.1 |
| 3,421,508 | 1/1969 | Nestrock......................... | 128/303.1 |
| 3,439,680 | 4/1969 | Thomas, Jr..................... | 138/303.1 |

Primary Examiner—Channing L. Pace
Attorney, Agent, or Firm—McGlew and Tuttle

[57] ABSTRACT

A heat insulated flexible connection for a cryoprobe comprises an inner tube for the passage of a cooling medium which is advantageously flexible and arranged within an outer tube portion defining a return flow space for the cooling medium and held in position by axially arranged spacers. The outer tubular portion is surrounded by a plurality of axially arranged insulation rings which have ends which may be loosely interengaged to permit flexible movement of the tube and which are shaped so as to space an outer cover from the outer tube which surrounds the inner cooling tube. The flexible tube is connectable to a probe which includes a tubular probe housing having an end which is closed and defines a probe contact surface. The inner tube of the flexible tube extends into the housing and terminates short of the surface in a space which defines an evaporation chamber adjacent the probe contact surface. A surrounding intermediate tube arranged within the housing around the inner tube defines a return flow space and also an insulation space between it and the outer housing. Heater means are contained in the housing which advantageously are located in the housing wall or in the tube surrounding the inner coolant supply tube.

21 Claims, 3 Drawing Figures

CRYOPROBE AND FLEXIBLE CONNECTOR THEREFOR

BACKGROUND OF THE INVENTION

1. Field of the Invention

This invention relates in general to the construction of probes particularly for treating body tissues and in particular to a new and useful cryoprobe and a heat insulated flexible connection therefor.

2. Description of the Prior Art

The present invention deals particularly with the construction of a probe of a type which is adapted to conduct a coolant to a body tissue for the purpose of freezing the tissue. In addition the invention provides an improved heat insulated flexible line in the form of a co-axial double line which is connectable to the cryoprobe operating unit. It is known to provide vacuum insulated coaxial double lines for connection of a cooling medium to a cryoprobe which include an inner tube through which a liquid nitrogen is supplied into the evaporation chamber of the cryoprobe. The warmer evacuated gas will return from the evaporation chamber to the operating unit through an outer tube. In order to prevent heat losses and particularly to obtain an appropriate surface temperature on the contact surface of the probe, an outer evacuated hollow space is used which communicates with a corresponding hollow space provided in the shaft of the cryoprobe. A heat insulation using vacuum seems to be a proper solution of the problem but such a solution requires very high expenses in the construction and the necessary apparatus which is needed because of the fact that the parts are hermetically closed and the construction requires the maintenance of a permanent high vacuum in the insulated hollow space.

SUMMARY OF THE INVENTION

In accordance with the invention there is provided a heat insulated flexible line construction which has the favorable properties of a vacuum insulation but does not require such an expensive construction. With the inventive arrangement the inner tube which is designed as a flexible tube and which is provided for the supply of the cooling medium is enclosed within an outer tube on a plurality of spaced supporting elements arranged along the axis of these tubes. Both tubes are arranged within a plurality of interconnected insulation rings which extend along the axis of the outer tube and are covered by an exterior cover. The insulation rings fit together loosely and permit flexible movement between each ring element so that the resultant structure is very flexible. The heat insulation rings are advantageously made of cellular plastic such as polyurethane and they include respective end portions which permit their loose interengagement and flexible movement. Such a design provides a satisfactory heat insulation and in addition offers considerable advantages in use compared to a vacuum connection.

The heat insulation elements are advantageously rings having tubular engaging sockets at one end and opposite ends which engage in the next adjacent socket in a loose fashion. For this purpose the receiving socket is advantageously made of a larger interior diameter than the external diameter of the projecting engagement end of each ring. The interengageable heat insulation rings form a dense cover surrounding the combined inner and outer tubes. A satisfactory design of the elements is an interengagement of a tubular member in a tubular receiving socket but the construction may be such that the receiving socket and interengaging part are spherical elements.

In a preferred form of the invention the rings include portions which are made of very much larger exterior diameter than the remaining portions so that they form vaulted spaces between the outer tube and a surrounding cover. The construction also prevents a damaging of the heat insulation elements or their contamination.

Because the heat insulated flexible line is designed without a vacuum it is necessary to construct a cryoprobe to adapt it to the construction of the flexible connection. With the invention the cryoprobe is formed with an outer tubular housing having a closed end which is the probe contact surface which engages over an extension of the flexible connecting tube which advantageously includes an outer tube surrounding an inner tube for the cooling medium which is extended beyond the flexible tube connection and the outer tube into the probe housing. The probe housing is constructed so that when it interengages with the flexible tube it defines a free annular space around the annular tube projection forming an insulation space, and in addition the space between the outer tube projection provides a passage for the return of the cooling medium from an evacuation chamber end of the probe housing adjacent the probe contact surface into the annular space in the flexible connecting tube for the return flow of the medium. The air filled space defined between the outer extension tube of the flexible tube connection which is arranged within the probe housing and the interior wall of the probe housing provides an insulation area for the probe housing. The probe housing is also provided with one or more separately operable heaters arranged along the length thereof for selectively heating the interior of the housing after the cooling process is finished. The heaters may be positioned in the probe housing wall or directly within the wall of an outer tubular extension of the flexible connection. The temperatures of the heaters are advantageously controlled by separate control sensors or control elements within the housing at selected locations. It has been found that the relative heating effects are sufficient to keep the shaft at an appropriate hand temperature without causing an undesirable additional evaporation of the cooling medium such as liquid nitrogen through the air filled insulating hollow space which surrounds the tubular extension within the probe housing.

In a preferred embodiment of the invention at least a part of the electrical control and supply lines which are connected to the cryoprobe and both temperature control elements in the cryoprobe housing may be placed in recesses of the heat insulating elements of the flexible connecting line. Another possibility is to place these supply lines in the annular channel formed by the outer tube and which also provides a return conduit for the coolant medium. With such an arrangement a desired compact construction is effected.

Instead of a fixed connection of the heat insulated flexible line with the cryoprobe, a coupling piece is advantageously used which can be interchangeably connected to different cryoprobes. In such a case it is useful to provide the hollow insulation space at the inner side of a plug portion of the coupling piece and the heating device. This is advantageously also controlled by a temperature sensor which acts on the coupling piece. Advantageously the coupling piece may comprise a tubular heated plug-in portion for connecting cryoprobes of different shape and plug pins may advantageously be provided on the coupling piece for connecting the electrical switch and control parts of the cryoprobe.

The cryoprobe of the invention of course may be used without the heat insulation flexible line described for example with another heat insulation construction such as a lining of powder insulation or the like.

Accordingly it is an object of the invention to provide an improved cryoprobe and a flexible insulation connection line for supplying cooling medium thereto wherein the cryoprobe includes a tubular receiving housing having a probe contact end and wherein the flexible connection line includes an inner tube for the transport of a cooling medium which terminates in the cryoprobe housing short of the end wall thereof in an evacuation chamber portion thereof and wherein the housing contains an outer tubular part spaced from the inner tubular part defining a return flow passage and an insulation area between the outer tubular part and the cryoprobe housing and wherein the flexible connecting line advantageously includes a continuation of the outer tube part which is surrounded by a plurality of ring shaped insulation members which are arranged axially and interengage so as to permit flexibility of the connecting line.

A further object of the invention is to provide a flexible connecting line for a cryoprobe which includes an inner tube for the conduction of a cooling medium arranged within an outer tube by a plurality of axial spaces extending between the tubes and wherein the outer tube is surrounded by a plurality of ring shaped elements arranged in axial end to end engagement and which are loosely interfitted so as to permit easy flexible movement thereof.

A further object of the invention is to provide a cryoprobe which includes an outer tubular housing, an inner small diameter tubular conduit for the conduction of cooling medium into the outer tubular housing to a location spaced from an end wall of the housing which defines a contact probe surface and an interior evaporation chamber, and which also includes an outer tubular extension surrounding the inner tube but spaced inwardly from the walls of the tubular housing and which defines a return conduit for the coolant between the inner tube and the tubular extension and an insulation space surrounding the tubular extension and the housing and wherein the housing also carries at least one separate heater for control of the temperature within said housing.

A further object of the invention is to provide a cryoprobe and a flexible tubular connection which are simple in design, rugged in construction and economical to manufacture.

For an understanding of the principles of the invention, reference is made to the following description of a typical embodiment thereof as illustrated in the accompanying drawing.

GENERAL DESCRIPTION OF THE PREFERRED EMBODIMENTS

Figure 1:
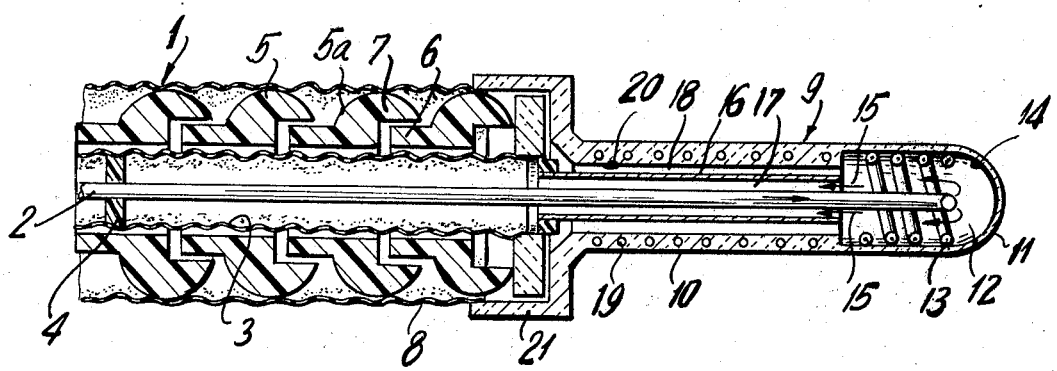
FIG. 1 is a partial longitudinal sectional view of a cryoprobe and flexible tubular connection therefor constructed in accordance with the invention.

Referring to the drawings in particular the invention embodied therein comprises in FIG. 1 a flexible tubular connection generally designated 1 for a cryoprobe generally designated 9.

In accordance with the invention the flexible tubular connection 1 comprises an inner tube for the supply of a low boiling medium or a cooling medium to the cryoprobe. The inner tube 2 is surrounded by an outer tube 3 which is designed as a flexible tube and particularly a corrugated tube. The inner tube 2 is arranged in a spaced location within the interior of the outer tube 3 by plastic webs 4 which extend between these two tubes but which do not occupy the complete annular space therethrough in order that the space between the tubes define a return flow conduit for the cooling medium. The outer tube 3 is surrounded by a plurality of insulating elements in the form of rings 5 which are arranged in end to end axial alignment and spaced axially along the outer tube 3. In the preferred form each of the insulation rings 5 include one end having a tubular engagement end 6 which is engageable into a tubular receiving socket 7 of the next adjacent ring element 5. The receiving socket 7 includes an interior diameter which is larger than the exterior diameter of the tubular engagement end 6 so that deformation free mobility is insured between the two adjacent ring members. The rings 5 are advantageously made of a cellular plastic. The rings include a vaulted surface part 5a which is of a much greater diameter than the remaining part and which holds an outer cover 8 at a position wherein a plurality of air cavities are defined within the space. The outer cover 8 advantageously comprises a flexible hose.

As shown in FIG. 1 the flexible connecting tube 1 is engaged within a cryoprobe 9 which includes a tubular housing 10 having an outer end which is closed to define a probe contact surface or probe point 11. In the preferred construction the inner tube 2 of the flexible connection 1 is made of a length such that it extends into the tubular housing 10 and terminates in a discharge opening at a spaced location from the probe contact surface 11 in an evaporation chamber 12.

Either the probe 9 or the flexible connection contains an outer tubular extension 16 which extends part way into the housing 10 up to the evacuation chamber 12 and which defines a return flow space 17 which communicates with the annular return flow space between the inner tube 2 and the outer tube 3 of the flexible connection 1. An additional function of the extension tube 16 is that it also forms an annular insulation space 18 between it and the interior wall of the probe housing 10. The cryoprobe 9 also includes heating means which in the examples shown includes a separate electrical heater 13 arranged adjacent the contact surface 11 and the operation of this heater is controlled by control element 14 located within the evaporation chamber 12. The heater would be operated after the treatment has been terminated in order to detach the probe from the frozen tissue. The flow direction of the coolant through the tube 2 to the evaporation chamber 12 and then return through the space 17 is indicated by the arrows in FIG. 1. In addition the cryoprobe 9 includes a seperate heater 19 having a thermal element 20 which provides a control for the operation of this heater. In the embodiment of FIG. 1 the housing 10 is provided with a flange portion 21 which engages for example by a threaded or press fit connection to the flexible connecting line 1.

Figure 2:
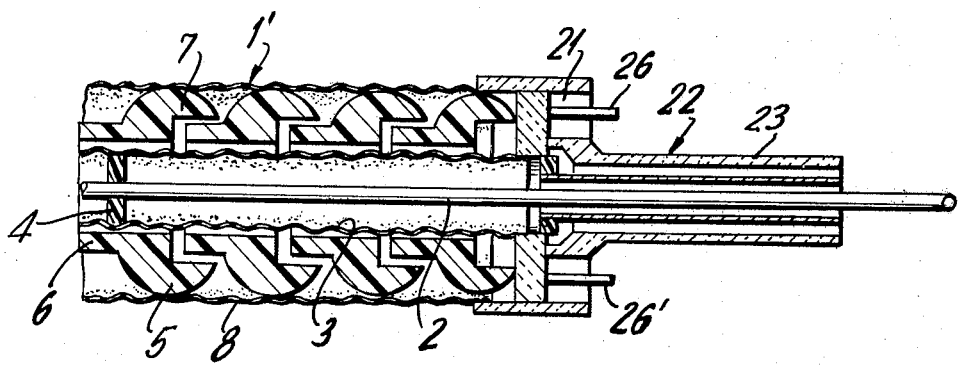
FIG. 2 is a view similar to FIG. 1 but without the cryoprobe housing of another embodiment of flexible connection tube.

In the embodiment of FIG. 2 a flexible connection 1' includes a construction which is substantially identical with the connection 1 of FIG. 1 with the exception that the flexible connection is provided with a plug extension 22 which comprises an outer tubular extension 23 which is similar to the extension 16. The tubular extension 23 is carried on a flange extension 21 of the flexible connection 1' and this extension also carries plug pin elements 26, 26' which may be interengaged with similar plug receiving elements or recesses 24 and 25 of a probe generally designated 9' shown in FIG. 3. The interengageable plug pins 26 and 26' and receiving recesses 25 and 24 are connected to corresponding lines (not shown) for supplying electrical current through the control elements 14 and 20 and also to the heating elements 13 and 19.

Figure 3:
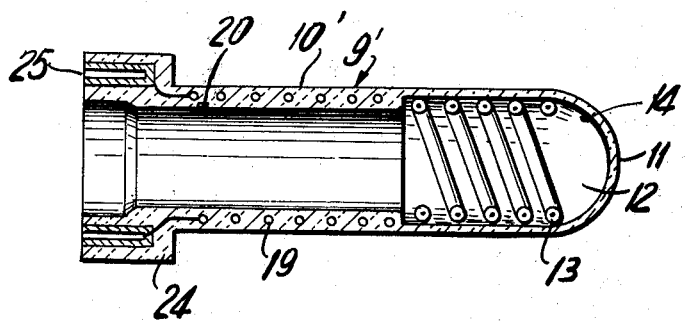
FIG. 3 is a view similar to FIG. 1 of another embodiment of cryoprobe housing.

In some instances it is preferable to provide the heating elements 19 in the walls of the extension 16 or the extension 23 of the embodiments of FIGS. 1 and 2 respectively. In the embodiments of FIGS. 2 and 3 the heaters 19 are located in the wall of the cryoprobe 9.

The cryoprobe 9 or 9' can be manipulated in a very simple manner and is easily movable in any direction. A completely satisfactory heat insulation of the housing 10 of the cryoprobe is possible with the construction of the invention and a continuous connecting line to the operating unit for supplying the coolant is insured. The heat insulated flexible line may be used not only in connection with a cryoprobe but in all cases where high demands on the heat insulation are to be met in connection with a certain flexibility of the transmission line.

While specific embodiments of the invention have been shown and described in detail to illustrate the application of the principles of the invention, it will be understood that the invention may be embodied otherwise without departing from such principles.

What is claimed is:

1. A heat insulated flexible line particularly a coaxial double line for connecting a cryoprobe with an operating unit to supply a cooling medium, comprising a flexible inner medium supply tube for supplying low boiling point medium to the probe, an outer tube surrounding said inner tube and defining an annular medium return flow space between said outer and inner tubes for the return of the medium, spacers surrounding said inner tube at spaced axial locations supporting said inner tube within said outer tube and permitting free flow of the return medium therethrough, and a plurality of axially arranged heat insulation rings arranged in end to end articulated interengagement around said outer tube whereby to provide deformation-free flexibility for the flexible connecting line.

2. A flexible connecting line according to claim 1, wherein said heat insulation elements comprise rings having a tubular socket end at one end and an opposite tubular projecting end engageable in the socket of a next adjacent ring, said tubular socket being of a larger interior diameter than said tubular projecting end so that there is a loose interengagement of said tubular projecting end in the receiving tubular socket of the next adjacent ring whereby to effect flexibility of said flexible line.

3. A flexible connecting line according to claim 1, wherein said heat insulation rings comprise a cellular plastic material.

4. A flexible connecting line according to claim 1, wherein at least some of said rings include an exterior vaulted wall formation providing a portion of said rings which are of much greater diameter than the remaining portion.

5. A flexible connecting line according to claim 1, including a cover surrounding said rings and engaged over said larger diameter portion.

6. A flexible conecting line according to claim 1, wherein said line includes a tubular extension portion adapted to extend outwardly from the end of the flexible connecting line and into a probe housing surrounding said inner conduit and being spaced therefrom to define a return flow conduit communicating with the return flow conduit between said inner tube and said outer tube.

7. A flexible connection according to claim 6, including a plug portion at an end of said flexible conduit containing said tubular extension and having connecting elements therein for interconnecting said flexible conduit electrically with a probe.

8. A flexible connecting conduit according to claim 7, including a probe housing engaged over said plug extension and having a closed end forming a contact probe surface and an interior evaporation chamber adjacent said closed end, said inner tube extending into said evaporation chamber and terminating in an opening at a spaced location from the closed end of said probe.

9. A flexible connection according to claim 8, wherein said tubular extension is spaced from the probe housing and defines an insulation space therebetween.

10. A cryoprobe comprising an outer tubular closed housing having a closed end defining a probe contact surface, an inner tube for the supply of cooling medium extending through said housing and terminating in an inner end with a discharge opening located at a spaced location from said probe contact surface, the space surrounding said inner end in said housing defining an evacuation chamber, and outer tube between said inner tube and said outer tubular housing defining a return flow passage for the cooling medium between said inner and outer tubes, said outer tube also being spaced radially inwardly from said outer tubular housing and defining an insulation space between said outer tube and said housing, and heater means in said housing for the controlled heating of the interior thereof.

11. A cryoprobe according to claim 10, wherein said heater means are located within the wall of said housing.

12. A cryoprobe according to claim 11, including temperature control means in said housing connected to said heater means for regulating said heater means.

13. A cryoprobe according to claim 10, wherein said heater means includes a heater located within said housing adjacent the contact probe surface and control means in said housing adjacent said heater for controlling the temperature thereof.

14. A cryoprobe according to claim 10, wherein said heater means are located along the length of said housing surrounding said outer tube.

15. A cryoprobe according to claim 10, including a flexible connection connected to said tubular housing adjacent the end thereof opposite to said contact probe surface, said flexible connection containing said inner tube for cooling medium and having a flexible conduit outer tube communicating with the space between said inner tube and outer tube of said probe.

16. A cryoprobe according to claim 15, wherein there is a space between said outer tube and said ring elements for the passage of supply lines.

17. A cryoprobe according to claim 15, wherein said flexible tubular connection has an end with a plug formation which is interconnected with said cryoprobe housing and includes an electrically projecting coneecting part on said plug which are interengageable with electrical connecting parts on said housing.

18. A cryoprobe according to claim 17, wherein said plug includes a tubular extension forming said outer tube of said probe surrounding said inner tube.

19. A cryoprobe according to claim 18, including a protective tube around said outer tube and spaced inwardly from the wall of said cryoprobe housing.

20. A cryoprobe according to claim 15, wherein said cryoprobe housing includes an end opposite said closed end having a flange containing a receiving recess for a connecting element, said flexible connecting line having an electrical connecting element engageable in said recess of said flange of said cryoprobe housing.

21. A cryoprobe according to claim 15, including ring elements in said insulation space with recesses extending axially therealong for accommodating supply lines.

* * * * *